United States Patent

[11] 3,561,625

[72] Inventors John Dioguardi
Port Washington;
Laszlo Nemessanyi, Westbury, N.Y.
[21] Appl. No. 824,144
[22] Filed May 13, 1969
[45] Patented Feb. 9, 1971
[73] Assignee Tridair Industries
Redondo Beach, Calif.
a corporation of California

[54] TRAILERS WITH POWER TRANSFER SYSTEM
8 Claims, 6 Drawing Figs.
[52] U.S. Cl. .................................................. 214/84,
198/127; 104/43, 104/47; 214/38
[51] Int. Cl. .................................................. B60p 1/52
[50] Field of Search .................................................. 214/84,
515, 38.10; 280/408, 411, 411.1; 198/127;
104/35, 43, 44, 47

[56] References Cited
UNITED STATES PATENTS
1,541,457 6/1925 Winn .................................. 214/38(.10)
3,480,295 11/1969 Duerksen ....................... 280/408

Primary Examiner—Albert J. Makay
Attorneys—Arthur W. Fuzak and Donald J. Ellinsberg ABSTRACT: A cargo trailer to be coupled in train to others and to be drawn by a drive vehicle provided with a single power source for the trailers. The trailer includes a chassis with rigidly running wheels and a rectangular platform with cargo conveyor rollers journaled between the platform sides. The several rollers have interconnected drive means so that driving torque applied to one roller will impart conjoint rotation to all. The trailer has a flexible shaft extending over its length, which drives stub shafts journaled in a gear box. Each stud shaft has a shaft which can engage a roller. A king pin pivotally joining the chassis and platform, permitting rotation of the latter to provide a cargo turntable.

PATENTED FEB 9 1971

INVENTORS.
JOHN DIOGUARDI
LASZLO NEMESSANYI
BY
JOHN P. CHANDLER
THEIR ATTORNEY.

PATENTED FEB 9 1971

INVENTORS.
JOHN DIOGUARDI
LASZLO NEMESSANYI
BY
JOHN P. CHANDLER
THEIR ATTORNEY.

INVENTORS.
JOHN DIOGUARDI
LASZLO NEMESSANYI
BY
JOHN P. CHANDLER
THEIR ATTORNEY.

TRAILERS WITH POWER TRANSFER SYSTEM

This invention relates to self-tracking trailers drawn by a powered drive vehicle moving packaged cargo and pallets from a warehouse to an aircraft substantially at ground level, and for other uses.

An important object of the invention is to provide trailers with power transfer system extending from the lead vehicle to the end of the train and with power drive conveyor means whereby a single power source in the drive vehicle furnishes power to the other vehicle for driving roller conveyors and so arranged that a container or pallet may be moved from one end of the trailer train to the other.

The power transfer system of the present invention is essentially a flexible shaft extending the length of each trailer with power coupling means therebetween and to the drive vehicle. The system is such that change in the direction of the conveyor rollers is effected without reversing the power source and the conveyor in each trailer can be neutralized without affecting the conveyor in the other trailers.

This is accomplished by providing drive means interconnecting the rollers so that driving torque applied to one roller will impart rotation to all and the torque is applied by one or the other of two friction wheels on aligned shafts journaled in a gear box wherein one friction wheel may continuously rotate, during loading, in one direction while the other rotates in the opposite direction. The gear box is pivoted within the trailer chassis so that one friction wheel or the other is manually raised to contact and drive one roller.

Another object of the invention is to provide a novel trailer with power conveying means thereon, and having a turntable platform, also carrying the conveyor rollers and wherein cargo containers may be added to or removed from the side of the train without uncoupling trailers or moving other containers.

The friction drive earlier mentioned can contact one of the interconnected rollers only when the turntable is positioned in its normal position with the rollers perpendicular to the direction of travel. The drive vehicle may be uncoupled from the train when cargo is to be removed from the side of one trailer, and is driven to a position to the side of the trailer and at right angles thereto. In this position, it may receive the cargo from the turntable which has been swung to a 90° position. A drive wheel at the front of the lead vehicle engages a front conveyor roller on the turntable, producing rotation of the other rollers. To effect this side delivery of the cargo, it is not, of course, necessary to uncouple the drive vehicle because another vehicle can be used for this purpose. In the drawings FIG. 1 is a plan view of a plurality of trailers of the present invention, and including a drive vehicle, coupled in train, one of the trailers showing the turntable rotated to 90° for side discharge;

Figure 1:
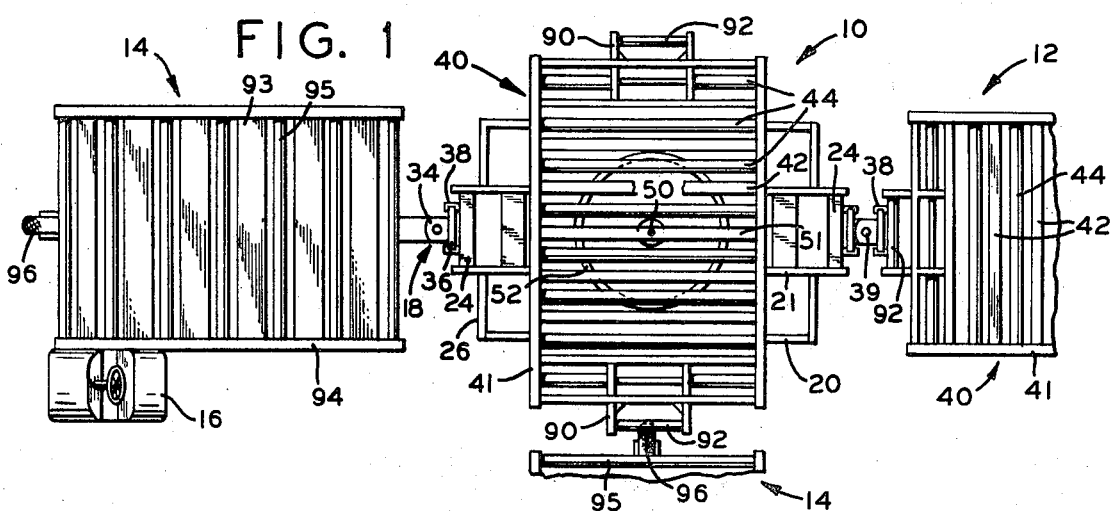
Figure 2:
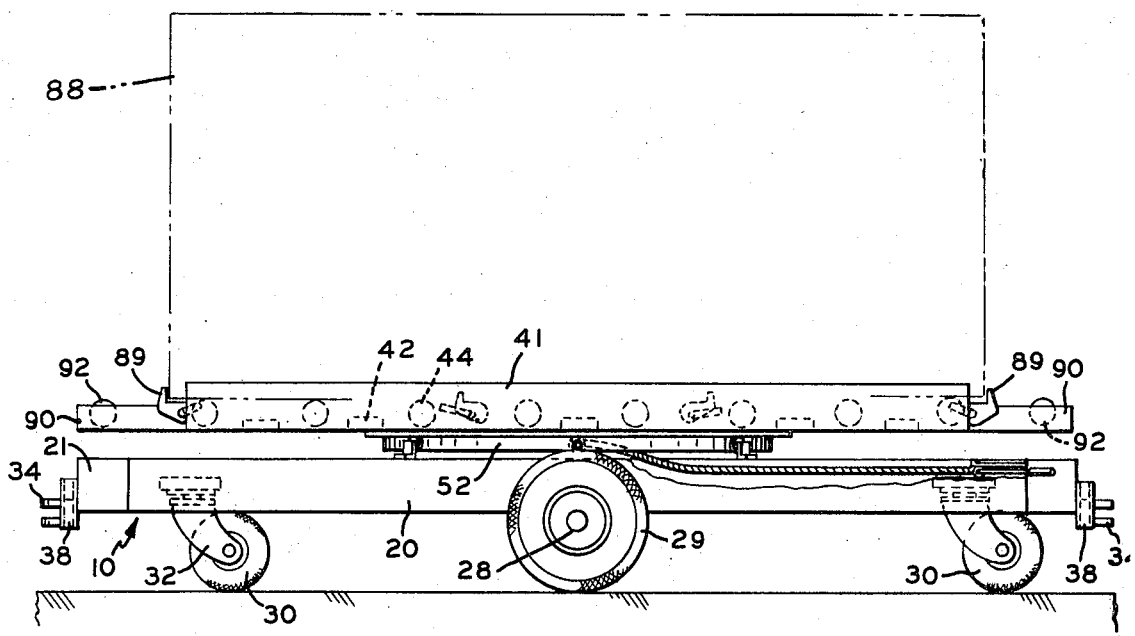
FIG. 2 is a side elevation of one of the trailers.
Figure 3:
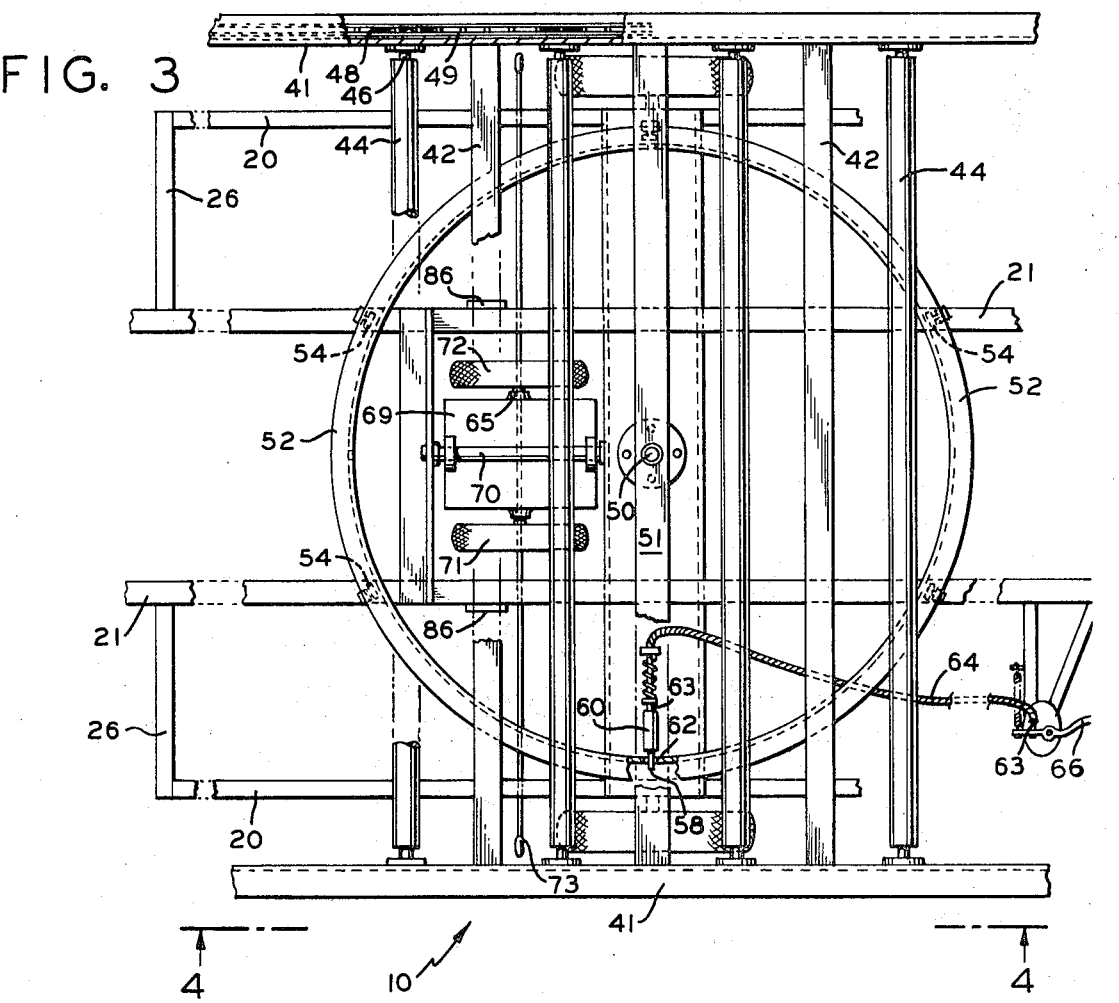
FIG. 3 is a broken plan view showing the details of the turntable assembly.
Figure 4:
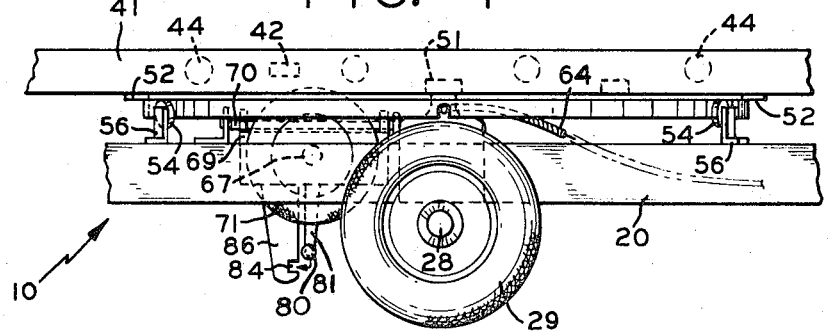
FIG. 4 is a side elevation thereof.
Figure 5:
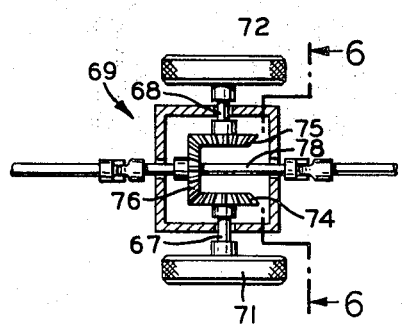
FIG. 5 is a broken plan view of the gear assembly at the center of the flexible shaft for the power transfer.
Figure 6:
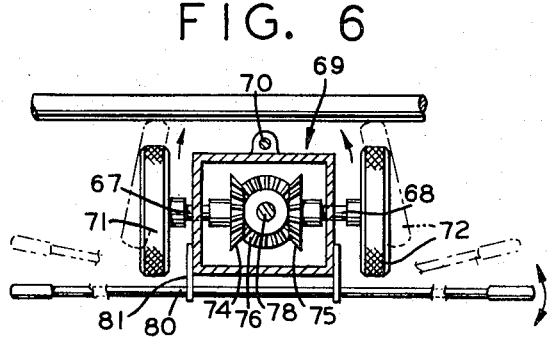
FIG. 6 is a section taken on line 6—6 of FIG. 5.

There is shown in FIG. 1 a plan view of a train of trailers 10 and 12 drawn by a driven vehicle 14 having a cab 16 for the driver and an engine (not shown) providing traction for the train. It also has a power source for simultaneously driving all mechanical devices on the several trailers in the train, such as the conveying rollers, earlier mentioned, and having novel mechanical coupling means 18 for quickly coupling the trailers and the drive vehicle together. A single power source may provide both drives.

The trailer has a novel turntable arrangement whereby rotation of the turntable 90° will permit a container or pallet to be removed or added from the side of the train anywhere within its length without uncoupling the trailers or moving other containers. It also permits packaged cargo to be transferred from the side of the train to a high lift tractor to be transferred to the cargo hold.

Each trailer has a chassis with a frame structure including outer longitudinal beams 20, inner longitudinal beams 21 which are spaced from each other and extend beyond the ends of beams 20 and are connected at their outer ends by transverse frames 24. The frame structure further includes transverse beams 26, all rigidly joined together as by welding.

An axle 28 is supported by the frame transversely thereof on a fixed axis midway between the ends of the trailer. Rubber tired wheels 29 are mounted for rotation at the ends of the axle. At each end of the frame, and equally spaced from each side thereof, is a caster type of wheel 30 supported for rotation in a swivel-type U-shaped frame 32 with arcuate side plates. This assembly provides the self-tracking arrangement so that as any lead trailer turns to the right or to the left the swivel caster turns an appropriate amount, and the central wheels 29, supporting the major portion of the load, causes the trailer to execute the same turn without any binding action.

The turntable assembly includes a frame 40 formed with longitudinal beams 41 and transverse beams 42 rigidly joined together. Conveying rollers 44 are mounted on fixed shafts 46 which are journaled in beams 41 and have sprockets 48 at their ends which are engaged by endless chains 49 so that any drive applied to one roller will produce conjoint rotation in the other rollers. The turntable frame is pivoted on the lower fixed frame structure 10 by means of a king pin 50 passing through a central transverse beam 51 into a similar fixed beam in the trailer frame.

The turntable is further supported for rotation by a circular track 52 formed from an angle beam and carried by the turntable. The horizontal web of this track is engaged by a plurality of rollers 54 supported for rotation in angle brackets 56. The turntable is locked in its normal position with its side rails in coincidence with the side rails of the lower fixed frame by means of pin 58 mounted for sliding longitudinal movement in a bearing sleeve 60 carried by the lower fixed frame. The pin can be advanced to locking position in a hole 62 in the circular track by means of a flexible rod 63 in a sleeve 64 and connected with a crank 66.

Means for providing rotation of the conveyor rollers 44 comprise two aligned stub shafts 67 and 68 journaled in the sidewalls of a gear box 69 mounted for sidewise pivoted movement on a shaft 70 secured to the chassis frame. The shafts have friction wheels 71 and 72 fast at the outer ends thereof. Beveled gears 74 and 75 also fast on shafts 67 and 68 are driven in opposite directions by a single beveled gear 76 fast on a drive shaft 78 which may be driven by any suitable means but it is preferred to form this shaft as part of the power transfer system wherein a flexible drive shaft structure composed of shaft sections joined by universal couplings extends the length of each trailer. Novel means are provided for coupling the shaft structure together between two adjoining trailers.

When one friction wheel is raised into engagement with the central conveyor roller 44 the latter is driven in one direction and the other wheel produces opposite rotation. A rod 80 carried by plates 81 extending downwardly from opposite sides of gear box 69 extends to both sides of the trailer and when the rod is raised on either side it raises the friction wheel into driving relation with roller 44. It is secured in this position by moving it into a detent or notch 84 in a fixed bracket 86.

A container of cargo is shown at 88 and during movement over the trailer train, it is guided by the sides of beams 41 which are higher than rollers 44. Releasable latches 89 limit movement of the container at each end of the platform.

The platform has two frame members 90 extending beyond the platform at each end and these support a short roller 92 connected for conjoint rotation with the other rollers by suitable means (not shown).

The lead vehicle 14 has transverse beams 93 and opposed longitudinal beams 94 supporting conveyor rollers 95 at the same level as rollers 44 and 92 in the trailers. A friction wheel 96 at the front of the lead vehicle, which forms no part of the running gear, is driven by a shaft from the power source. Thus, when the platform has been swung 90° and the lead vehicle uncoupled and driven to the position of FIG. 1, friction wheel 96 turns the rollers and moves the container onto the lead vehicle. A separate trailer at the side of the train can accomplish the same result without uncoupling the drive vehicle. In some cases, the cargo can simply be moved onto a fixed platform.

We claim:

1. A trailer to be coupled in train to others for moving cargo boxes, pallets and the like, substantially at ground level, and drawn by a drive vehicle provided with a single power source for the trailers, each of said trailers including a chassis formed with a frame, running wheels journaled on the chassis, coupling means at opposite ends for joining the trailers in train, a rectangular platform formed with transverse and longitudinal beams rigidly secured together, cargo conveyor rollers journaled at their ends between said longitudinal beams, interconnecting drive means between the several rollers so that driving torque applied to one roller will impart conjoint rotation to all so that cargo can be moved throughout the length of the train, a flexible shaft structure to be driven by a power source in the drive vehicle and extending the length of each trailer with coupling means for adjoining shaft structures between the trailers, a gear box pivoted on a longitudinal axis on the chassis, stub shafts journaled in the gear box independently driven by said flexible shaft structure so as to provide opposite rotation thereof, a friction wheel fast on each stub shaft, each being engageable with a roller when either side of the gear box is tilted upwardly and a king pin pivotally joining the chassis and platform, permitting rotation of the latter to provide a cargo turntable so that cargo can be removed or added from the side of the train by rotating the platform about 90°.

2. The trailer defined in claim 1 wherein each end of the trailer has a short conveyor roller having a drive connection with the other rollers and which can be driven by a separate friction wheel drive applied thereto after the platform has been rotated 90°.

3. The trailer defined in claim 1 wherein there is positioned between the chassis and the platform a circular trackway mounted on one of said structures, the other carrying wheels which engage said trackway and support the platform in a horizontal position.

4. The trailer defined in claim 3 wherein the circular trackway is mounted on the chassis.

5. The trailer defined in claim 3 wherein the trackway is formed from an angle bar with an annular vertical web and a horizontal web engaged by said rollers.

6. The trailer defined in claim 1 wherein a latch is provided to secure the platform against rotation.

7. The trailer defined in claim 1 wherein a rod secured to the gear box extends to both sides of the chassis to raise one friction wheel or the other to engage one roller and drive the interconnected roller in one direction or the other.

8. The trailer defined in claim 7 wherein a detent secured one end of the rod in raised position with its friction wheel engaging a roller in driving relation.